United States Patent [19]

May

[11] 4,399,607

[45] Aug. 23, 1983

[54] METHOD AND APPARATUS FOR MAKING RECOMBINANT STORAGE BATTERIES HAVING COATED INTERCELL CONNECTORS

[75] Inventor: Geoffrey J. May, Warrington, England

[73] Assignee: Chloride Group Limited, London, England

[21] Appl. No.: 306,672

[22] Filed: Sep. 29, 1981

[30] Foreign Application Priority Data

Oct. 8, 1980 [GB] United Kingdom ................. 8032506

[51] Int. Cl.³ ............................................. H01M 2/32
[52] U.S. Cl. .................................... 29/623.5; 29/730; 118/421; 118/DIG. 5; 427/185
[58] Field of Search ................ 429/65, 121; 29/623.1, 29/623.2, 623.4, 623.5, 730, 527.4; 427/185; 118/421, 429, DIG. 5

[56] References Cited

U.S. PATENT DOCUMENTS

| | | | |
|---|---|---|---|
| 3,264,131 | 8/1966 | Nagel | 427/185 |
| 3,419,409 | 12/1968 | Dettling | 427/185 |
| 3,616,845 | 11/1971 | Farmer | 164/333 |
| 4,113,165 | 9/1978 | Ott | 118/421 |

FOREIGN PATENT DOCUMENTS 1249192 10/1971 United Kingdom ......... 118/DIG. 5

*Primary Examiner*—Lowell A. Larson
*Assistant Examiner*—Jonathan L. Scherer
*Attorney, Agent, or Firm*—Oblon, Fisher, Spivak, McClelland & Maier

[57] ABSTRACT

A method of manufacturing a recombinant lead acid battery includes placing two or more cell packs in a battery container and then loading the container into a frame mounted on a rotary capstan. The container is transferred to a moulding station and the plate straps and intercell connectors are moulded around the plate lugs. The container is then transferred to a coating station and the intercell connectors are dipped while still hot into a fluidized bed of epoxy resin particles. The particles adhere to the intercell connectors and are cured by their heat thereby forming an impervious layer around them. This layer acts as an electrolyte creepage barrier and prevents the surface of the intercell connectors acting as an electrolyte path for intercell ionic leakage.

13 Claims, 5 Drawing Figures

METHOD AND APPARATUS FOR MAKING RECOMBINANT STORAGE BATTERIES HAVING COATED INTERCELL CONNECTORS

BACKGROUND OF THE INVENTION

The present invention relates to a method of manufacturing electric storage batteries and to an apparatus for manufacturing such batteries and is particularly, though not exclusively concerned with such batteries of lead acid type. The invention is concerned with recombinant batteries which are those which contain substantially no free unabsorbed electrolyte and in which the gases evolved during charging or operation are induced to recombine within the battery and are not vented to the atmosphere.

In conventional batteries which contain free electrolyte the intercell connectors generally pass through or over the intercell partitions and are sealed to them and the partitions in turn are sealed to the battery lid. This prevents electrolyte passing from cell to cell and thus eliminates the risk of intercell ionic leakage currents which degrade the battery's performance and shorten its service life.

It has, however been found that, contrary to conventional teaching, in recombinant batteriess containing substantially no free unabsorbed electrolyte the intercell partitions do not need to be sealed to the battery lid in order to prevent the battery failing prematurely due to intercell ionic leakage currents. Such a construction, in which there is a common headspace beneath the lid which communicates with all the cells, is both simpler to manufacture and has the advantage that a single vent may be provided for all the cells rather than having to provide a separate vent for each cell.

It is however believed that with the passage of time the surface of the plate straps and intercell connectors of such batteries, which are of lead or lead alloy in lead acid batteries, will become somewhat corroded by the action of the electrolyte and that this surface will therefore become somewhat pitted and porous. This pitted surface will provide a wicking path for electrolyte by virtue of capillary effects, that is to say the electrolyte will pass up the plates and along the plate straps and intercell connectors, and will then constitute an electrolyte path for intercell ionic leakage.

SUMMARY OF THE INVENTION

It is therefore an object of the present invention to provide a method and apparatus for manufacturing recombinant electric batteries with intercell connectors which are not sealed to the intercell partitions but which will not provide an electrolyte path for intercell ionic leakage.

According to the present invention a method of manufacturing an electric storage battery includes placing two or more cell packs comprising alternate positive and negative plates interleaved with compressible fibrous absorbent separator material into a battery container, transferring the container to a moulding station, forming plate straps and intercell connectors around the plate lugs in a plurality of mould cavities, transferring the container to a coating station and dipping the intercell connectors whilst still hot into a fluidised bed of organic polymer particles, preferably of an epoxy resin, which adhere to the intercell connectors to form an impervious layer around them.

The method preferably includes the step of inverting the battery container and forming the plate straps and intercell connectors, and preferably the terminal connectors also, by dipping the plate lugs into a plurality of moulds containing molten metal or into which molten metal is poured, and preferably also the step, prior to this, of transferring the container to a cleaning and fluxing station and cleaning the plate lugs and applying flux to them. Preferably the plate straps and intercell connectors are entirely above the upper edge of the container during the dipping step since this facilitates dipping the intercell connectors into the fluidised bed and ensures that the polymer material does not adhere to the battery container which might prevent the lid being subsequently properly sealed to it. This may be achieved by appropriate dimensioning of the cell packs with respect to the container or by only partially inserting the cell packs into the container. The cell packs are retained in this partially inserted position during the dipping step by virtue of the fact that they are preferably a tight fit within the container. The method also preferably includes the step of causing reciprocating movement between the intercell connectors and the fluidised bed to enhance the formation of an impervious layer over the entire periphery of the intercell connectors. Under certain circumstances or when using some particular resins it may be desirable to subject the intercell connectors to a heating step after the dipping step to ensure that the resin is fully cured. This may be effected by an infra red lamp or a hot air jet.

The provision of an impervious polymer layer right around the intercell connectors seals their surface and presents a barrier to the creepage of electrolyte along them substantially eliminating intercell ionic leakage currents. The use of a fluidised bed of resin material is both a simple and economical way of applying such an electrolyte creepage barrier and the application of the creepage barrier whilst the intercell connectors are hot both saves time and causes the resin to adhere only to those components of the battery where it is required.

The invention also embraces an apparatus for carrying out the method and thus according to a further aspect of the present invention apparatus for manufacturing an electric storage battery includes holding and transfer means for holding a battery container whilst containing two or more cell packs comprising alternate positive and negative plates interleaved with separator material and for moving the container successively to a moulding station and then to a coating section, a moulding station including a plurality of mould cavities for forming the plate straps and intercell connectors around the plate lugs, a coating station comprising a fluidised bed in which, in use, organic polymer particles are fluidised and means to cause relative movement between the battery container and the fluidised bed to dip the intercell connectors into the fluidised bed whilst they are still hot to coat them with an impervious layer of the said organic polymer.

The apparatus preferably also includes a cleaning and fluxing station comprising means to clean the plate lugs and means then to apply flux to them to ensure that the plate straps make a secure electrical connection with them.

The transfer means preferably includes a rotary capstan and the means for holding the battery container preferably comprises a rectangular frame secured to the transfer means and having one wall which is movably mounted with respect to the others and biassed inwardly, e.g. by means of a spring, to retain the battery container within the frame. The inner surface of the frame may carry slip-resistant means such as emery paper to prevent the battery slipping through the frame under the action of gravity.

The fluidised bed preferably includes a main fluidised bed and an auxiliary fluidised bed which is liftable out of the main fluidised bed and into which the intercell connectors are dipped. This will ensure an even reliable coating of the intercell connectors of successive batteries since the auxiliary bed is withdrawn into the main bed in between coating successive batteries and is thereby refilled to a constant level regardless of the amount of resin material in the main bed which thus may be replenished infrequently and in amounts which do not need to be precisely metered.

Further features and details of the invention will be apparent from the following description of a method in accordance with the invention of assembling a 12 volt lead acid recombinant battery which is given by way of example only with reference to the accompanying drawings in which:

DESCRIPTION OF THE PREFERRED EMBODIMENTS

Figure 2:
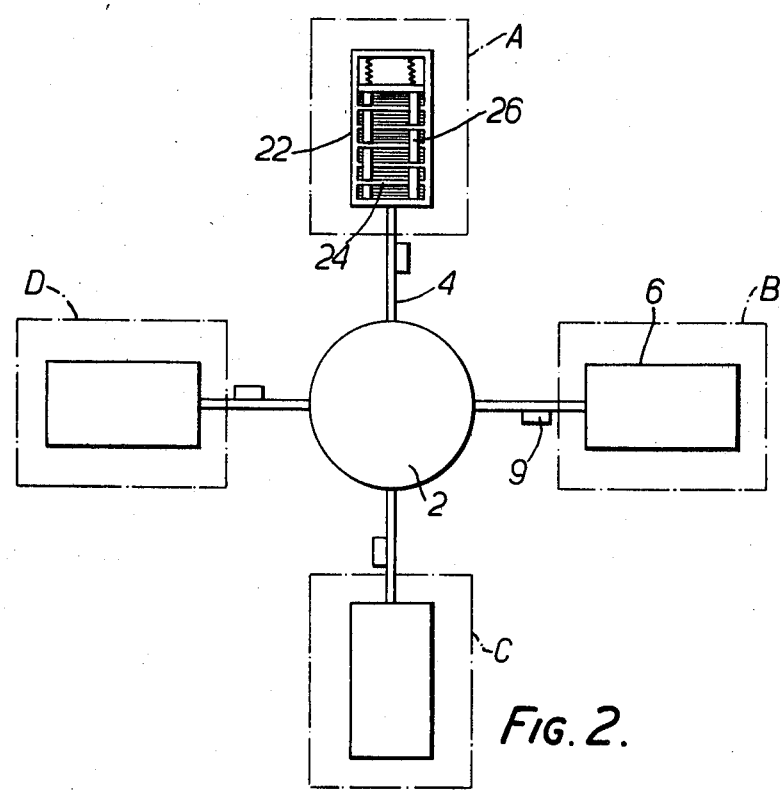
FIG. 2 is a highly schematic plan view of an apparatus in accordance with the invention.

As illustrated in FIG. 2 the apparatus comprises a rotatable capstan 2 carrying four arms 4 spaced apart by 90°. At the end of each arm is a rectangular frame 6, of which one end wall is movable and biassed inwardly by means of two springs. Each frame is adapted to receive a battery container, and the force exerted by the springs is sufficient to retain the battery container in the frame. The internal surfaces of the frames 6 are lined with emery paper or other material having a high coefficient of friction to prevent a battery container from slipping out of the frame. The capstan includes means to lower and raise each frame with respect to its arm and in this embodiment this includes a hydraulic piston/cylinder unit 9 secured to each arm adapted to move the associated frame vertically.

The capstan is provided with a rotary drive (not shown) adapted to index the capstan through steps of 90°. At eah rest position of the frames 6 there is provided a work station A, B, C or D. The first work station A is a loading and unloading station, and at this point a part assembled battery is inserted into a frame 6, and the battery which has just been treated by the apparatus is removed from the frame. This may be effected manually or alternatively mechanically by means which are not shown.

The second work station B is a brushing and fluxing station. At this point there is provided a series of brushes to remove dirt and oxides from the plate lugs and means to apply flux to them. Such a station is conventional in the battery industry and is described in, e.g. U.S. Pat. No. 3,616,845 and will therefore not be described in more detail.

Figure 3:
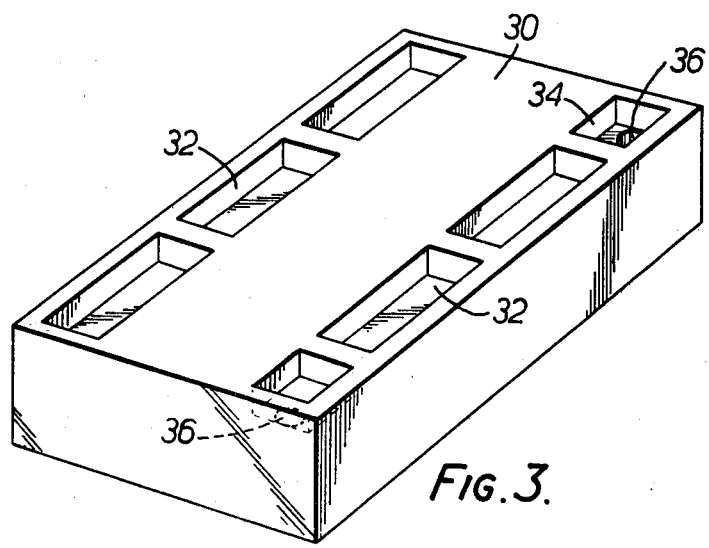
FIG. 3 is a diagrammatic perspective view of a mould block for forming the plate straps and intercell connectors.

The third station C is a moulding station and comprises a plurality of mould cavities shaped and arranged to correspond to the desired shape of the plate straps, intercell connectors and terminal connectors of the battery. The mould cavities may be defined by two sets of meshing combs which close around the plate lugs defining cavities into which the lugs project, but in this embodiment the mould cavities are defined by a mould block illustrated diagrammatically in FIG. 3. The mould block 30 has a line of three shallow elongate mould cavities 32 on one side of its upper surface and on the other side a further line comprising two further similar cavities 32 offset by half a pitch from those on the other side. At each end of the two cavities is a further cavity 34 of reduced length and having in its lower surface a cylindrical hole 36. In use, the mould cavities are filled with molten lead and the plate lugs are dipped into them to form the plate straps, intercell connectors and terminal connectors.

The fourth station D is an organic film application station. At this point there is provided a fluidised bed of epoxy resin powder incorporating a curing agent. A suitable resin is that sold by the 3M Company under the Trade Mark SCOTCHCOTE (type 206N) or that sold by Micro Reducers Ltd. under the Trade Mark TRI-TOHM (type 6/90/95) or that sold by Ciba-Geigy under the Trade Mark KU-600 ARALDITE. In use, the intercell connectors are dipped whilst still hot from their moulding into the fluidised epoxy resin powder which sticks to the hot lead and there cures to form an impervious layer but does not stick to the other components of the battery which are cold.

Figure 4:
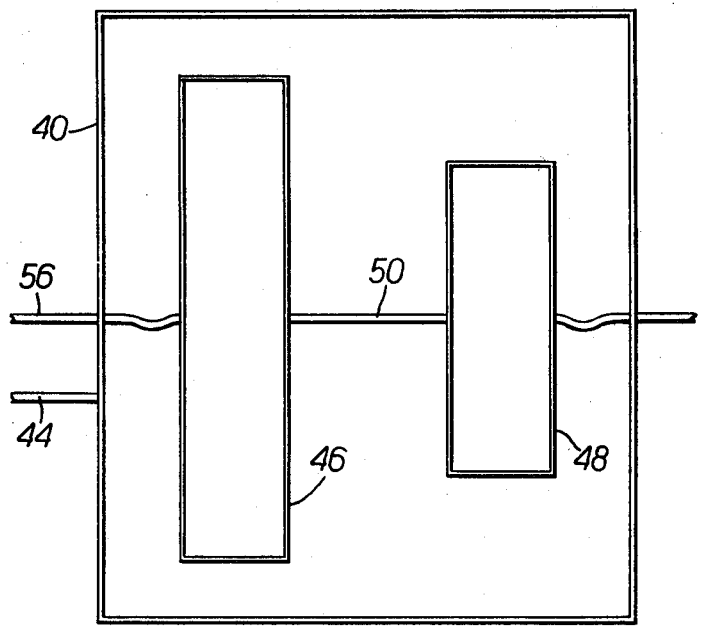
FIGS. 4 and 5 are a diagrammatic plan view and side sectional elevation respectively of the fluidised bed apparatus.
Figure 5:
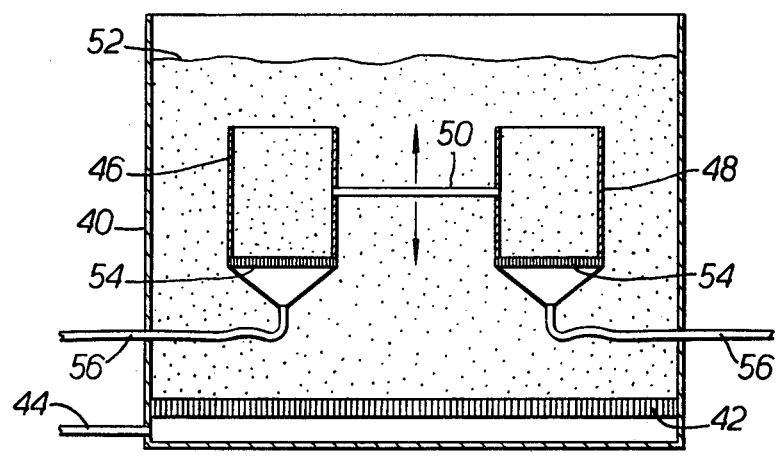

It will be appreciated that it is important that the terminal connectors are not coated with epoxy resin, for if this were to happen it would be necessary to subsequently remove this coating. For this reason, and to ensure a constant even application of epoxy resin to the intercell connectors the fluidised bed comprises a main fluidised bed within which is an auxiliary liftable fluidised bed. As is diagrammatically illustrated in FIGS. 4 and 5, the main fluidised bed comprises a container 40 extending across which is a porous plate 42 of ceramic or plastics material. An air line 44 connected to a blower (not shown) supplies air to the space below the plate 42 to fluidise the polymer particles within the container 40. The auxiliary bed comprises two spaced parallel troughs, a longer one 46 and a shorter one 48 connected by a linkage 50. A lifting mechanism (not shown) is provided to lift the two troughs from the rest position, seen in FIG. 5, in which the tops of the troughs are below the upper surface 52 of the fluidised polymer particles in the main bed 40 to a dipping position in which the tops of the troughs extend up above the suface 52. Each trough has a porous plate 54 similar to the plate 42 and air lines 56 connected to the blower supply air to the spaces below the plates 54 to fluidise the polymer particles within the troughs.

In use, the auxiliary bed is automatically raised above the level of polymer powder in the main fluidised bed, and the intercell connectors are dipped into the two troughs. After dipping the troughs are lowered down into the main bed and then raised again so the depth of the auxiliary fluidised bed is thus constant regardless of the quanity of the polymer particles in the main fluidised bed. The battery is positioned with respect to the troughs so that the terminal pillars 28 extend downwardly at either end of the shorter trough 48 and are thus not coated with the polymer material whilst all those plate straps 26 which constitute intercell connectors are dipped into one or other of the troughs and are thus coated with polymer material.

The method of assembly of the battery is as follows. Six cell packs 20 are made up from alternate positive and negative plates interleaved with separator material comprising a microfine glass fibre mat. Each plate has an upwardly projecting plate lug (not shown) on one side of its upper surface and the plates in each cell pack are arranged so that the positive and negative plate lugs form respective lines on opposite sides of each cell pack. The cell packs are then compressed to bring the plates and separators into intimate contact and are then partially introduced into a respective compartment in a compartmented polypropylene battery container 22 having integral partitions 24 whose upper edges are flush with the upper edge of the container. The upper surface of the cell packs and the plate lugs project above the container and are retained in this position by virtue of the fact that the cell packs are a tight fit within their respective compartments. This tight fit also maintains the intimate contact between the plates and separators which is believed to be important in recombinant batteries with a reduced amount of electrolyte to ensure that the plates are supplied with a sufficient amount of electrolyte for their electro-chemical requirements. The battery container is then inserted into a frame 6 at the loading station A of the apparatus illustrated in FIG. 2 and is retained there by the pressure of the springs 10 acting on the movable wall 8 and by virtue of the non-slip characteristic of the emery paper covering the inner surface of its walls.

The capstan is then indexed through 90° to bring the battery to the second work station B. Whilst being indexed the arm 4 is rotated through 180° so that the battery is upside down. The cell packs are sufficiently tight within the container that they do not fall out. On arrival at station B the battery is lowered about 5 cms and the plate lugs are cleaned and fluxed as described above. When this is complete the battery is raised again and the capstan is indexed through a further 90°.

Figure 1:
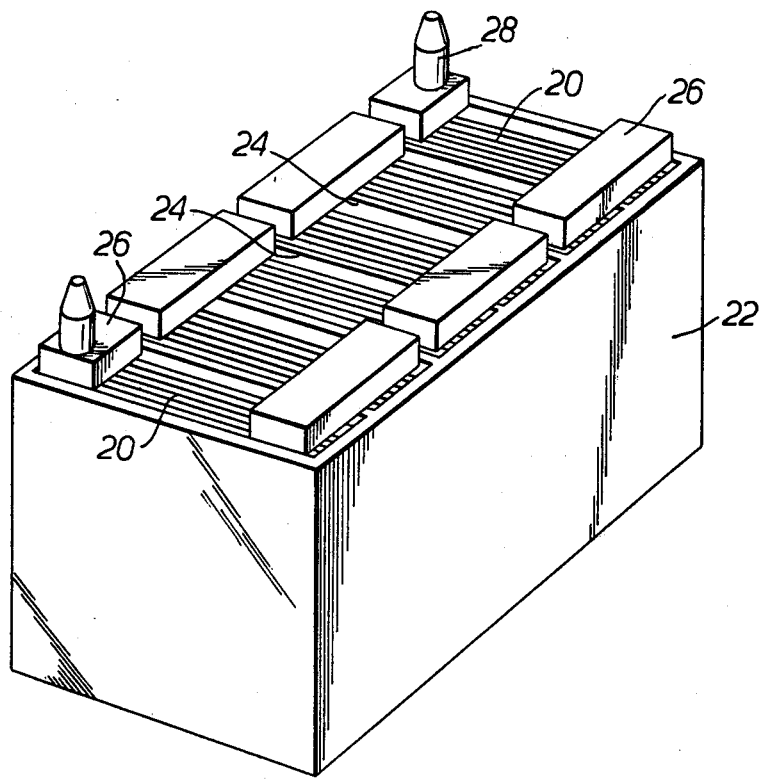
FIG. 1 is a perspective diagrammatic view of a part assembled battery.

On arrival at station C the battery is then lowered about 5 cms and the plate lugs are dipped into the mould cavities 32 and 34 which contain molten lead. The mould cavities are dimensioned and arranged in positions corresponding to the plate straps 26 and terminal connectors 28, as seen in FIG. 1. In each end cell a short plate strap is formed by the cavity 34 joining together only the lugs of one polarity, integral with which is a terminal connector 28 formed by the cavity 36. The remaining plate straps, which are formed by the cavities 32, are about twice as long and connect together the lugs of one polarity in one cell with those of the opposite polarity in an adjacent cell. These longer plate straps pass over the intercell partitions 24 and thus form intercell connectors. Once the lead in the mould has solidified, the battery is raised again and the capstan is indexed a further 90°.

Whilst the battery is travelling towards station D the auxiliary fluidised bed 46, 48 is raised out of the main fluidised bed 40. On reaching station D the battery is again lowered about 5 cms and the longer plate straps, which have not had time to cool appreciably after being moulded, are dipped into the fluidised polymer material within troughs 46, 48. Due to the fact that the trough 48 is shorter than the trough 46 the terminal connectors 28 and the shorter plate straps with which they are integral are not dipped into the fluidised material. The polymer particles which in this case are of epoxy resin adhere to the hot plate straps and cure there to form an impervious layer but they do not adhere to the other battery components which are cold. Whilst the longer plate straps are within the auxiliary fluidised bed either the battery or the auxiliary tray are reciprocated horizontally by means which are not shown to promote the passage of resin particles into the relatively small gap between the plate straps and the plate packs to ensure that the impervious resin layer extends right around the plate straps.

The battery is now raised again and the capstan is indexed through a further 90°. Whilst this is occurring the auxiliary bed is lowered again into the main fluidised bed to be replenished with epoxy resin particles and the arm 4 is again rotated through 180° so that the battery is in its original orientation when it arrives again at station A. The battery is then removed from the frame 6 either manually or mechanically and then transferred, e.g. by a conveyor which is not shown, to have its assembly completed. The latter includes sealing a lid to the battery and this has a depending peripheral flange which mates with the external edge of the container but no partitions corresponding to the partitions 24 in the container. The finished battery thus has a common head space below the lid communicating with all the cells and the lid is therefore provided with one vent only which vents all the cells. After sealing the lid to the container the electrolye is added to the cells, preferably in an amount which is insufficient to saturate the pores in the separators and plates. Alternatively the electrolyte may be added before or immediately after the cell packs have been inserted into the container.

It will be appreciated that during manufacture each frame 6 will carry a battery and that after each movement of the capstan an operation will be performed at each work station. If desired, separate loading and unloading stations may be provided in which case there will be five stations in all spaced apart by 72°. In the method described above the battery is lowered at each station towards a mould or tool but naturally it would be possible for the mould or tool to be raised instead.

Obviously, numerous modifications and variations of the present invention are possible in the light of the above teachings. It is therefore to be understood that within the scope of the appended claims the invention may be practised otherwise than as specifically described herein.

What is claimed as new and desired to be secured by Letters Patent of the United States is:

1. A method of manufacturing an electric storage battery including the steps of placing a plurality of cell packs into a battery container, said cell packs comprising alternate positive and negative plates interleaved with fibrous absorbent separator material, each of said positive and negative plates having a projecting plate lug, transferring said container to a moulding station and forming plate straps and intercell connectors around said plate lugs in a plurality of mould cavities, transferring said container to a coating station and dipping said intercell connectors whilst still hot into a fluidised bed of organic polymer particles which adhere to said intercell connectors to form an impervious layer around them.

2. A method as claimed in claim 1 wherein said polymer particles are of an epoxy resin.

3. A method as claimed in claim 1 or claim 2 including the step of inverting said battery container and forming said plate straps and intercell connectors by dipping said plate lugs into a plurality of mold cavities and introducing molten metal into said mold cavities.

4. A method as claimed in claim 3 including the step of transferring said battery container to a cleaning and fluxing station and cleaning said plate lugs and applying flux to them prior to forming said plate straps and intercell connectors.

5. A method as claimed in claim 1 or claim 2 wherein said battery container has an upper edge and said plate straps and intercell connectors are entirely above said upper edge during said coating step.

6. A method as claimed in claim 1 or claim 2 including the step of causing reciprocating movement between said intercell connectors and said fluidised bed during said coating step.

7. Apparatus for manufacturing an electric storage battery including holding means for holding a battery container whilst containing two or more cell packs, said cell packs comprising alternate positive and negative plates interleaved with separator material and said plates each having a projecting plate lug, and transfer means for moving said container successively to a moulding station and then to a coating station, a moulding station including a plurality of mould cavities for forming platestraps and intercell connectors around said plate lugs, a coating station comprising a fluidised bed in which, in use, organic polymer particles are fluidised and means to cause relative movement between said battery container and said fluidised bed to dip said intercell connectors into said fluidised bed whilst they are still hot to coat them with an impervious layer of said organic polymer.

8. Apparatus as claimed in claim 7 including a cleaning and fluxing station for cleaning said plate lugs and then applying flux to them.

9. Apparatus as claimed in claim 7 or claim 8 wherein said transfer means includes a rotary capstan.

10. Apparatus as claimed in claim 7 or claim 8 wherein said means for holding said battery container comprises a rectangular frame secured to said transfer means, said frame having a plurality of walls, one of said walls being movably mounted with respect to the remainder of said wall and biassed inwardly.

11. Apparatus as claimed in claim 10 wherein said plurality of walls carries slip-resistant material adapted to contact said battery container.

12. Apparatus as claimed in claim 7 or claim 8 wherein said fluidised bed includes a main fluidised bed and an auxiliary fluidised bed, said auxiliary fluidised bed being movable into and out of said main fluidised bed and into which, in use, said intercell connectors are dipped.

13. Apparatus as claimed in claim 12 in which said auxiliary fluidised bed is so shaped that when said intercell connectors are dipped into it the terminal pillars of said battery are not dipped into it.

* * * * *